United States Patent

Bunsen et al.

(10) Patent No.: US 9,279,381 B2
(45) Date of Patent: Mar. 8, 2016

(54) METHOD AND DEVICE FOR CONTROLLING AN INTERNAL COMBUSTION ENGINE

(75) Inventors: Eike Bunsen, Gifhorn (DE); Rene Fink, Wismar (DE); Kay Schintzel, Destedt (DE); Matthias Schultalbers, Meinersen/Ahnsen (DE); Olaf Magnor, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 1109 days.

(21) Appl. No.: 13/231,552

(22) Filed: Sep. 13, 2011

(65) Prior Publication Data

US 2012/0065865 A1  Mar. 15, 2012

(30) Foreign Application Priority Data

Sep. 13, 2010  (DE) .......................... 10 2010 045 083

(51) Int. Cl.
*B60W 10/06* (2006.01)
*F02D 41/40* (2006.01)
*F02D 41/10* (2006.01)

(52) U.S. Cl.
CPC .............. *F02D 41/401* (2013.01); *F02D 41/10* (2013.01); *F02D 2200/0406* (2013.01); *F02D 2200/1012* (2013.01); *Y02T 10/44* (2013.01)

(58) Field of Classification Search
CPC ................ B60W 10/06; B60W 10/08; B60W 2710/0644; F02D 29/02; F02D 28/00; F02D 41/30
USPC .................. 701/101, 102, 103, 104, 105, 110; 123/294, 295, 297, 299, 300, 304, 305
See application file for complete search history.

(56) References Cited

U.S. PATENT DOCUMENTS

| 5,095,874 A | 3/1992 | Schnaibel et al. |
| 7,305,964 B2 | 12/2007 | Scherrieble et al. |
| 7,475,671 B1 * | 1/2009 | Fattic et al. ............... 123/406.47 |
| 2006/0196467 A1 * | 9/2006 | Kang et al. .................... 123/305 |
| 2006/0201476 A1 | 9/2006 | Brachert et al. |
| 2009/0182485 A1 | 7/2009 | Loeffler et al. |

FOREIGN PATENT DOCUMENTS

| DE | 3540813 A1 | 5/1987 |
| DE | 39 30 396 | 3/1991 |
| DE | 68905482 T2 | 6/1993 |
| DE | 102 49 755 | 5/2004 |

(Continued)

OTHER PUBLICATIONS

Search Report issued for European Patent Application No. 11006052.2, mailed on Jan. 2, 2014.

*Primary Examiner* — Hai Huynh
*Assistant Examiner* — Raza Najmuddin
(74) *Attorney, Agent, or Firm* — Pearl Cohen Zedek Latzer Baratz LLP

(57) ABSTRACT

To prevent particle emissions, the start of injection of an internal combustion engine is controlled as a function of a detected dynamics of an operating parameter of the internal combustion engine. The dynamics is detected by comparing the temporal change of the operating parameter to a threshold value. The control may be carried out such that, in particular, a value of the start of injection, determined with the aid of a regulation, is frozen for a specific holding period following the detection of the dynamics.

10 Claims, 5 Drawing Sheets

(56) References Cited

FOREIGN PATENT DOCUMENTS

| | | |
|---|---|---|
| DE | 10321192 A1 | 12/2004 |
| DE | 103 44 423 | 4/2005 |
| DE | 10344428 A1 | 5/2005 |
| DE | 10 2007 052 615 | 5/2009 |
| DE | 10 2008 001 992 | 6/2009 |
| DE | 10 2008 004 361 | 7/2009 |
| EP | 0 641 925 A2 | 3/1995 |
| EP | 1 164 274 A2 | 12/2001 |
| JP | 60-19943 | 2/1985 |
| JP | 60-32961 | 2/1985 |
| JP | 61-093255 A | 5/1986 |
| JP | 63295829 A * | 12/1988 .............. F02D 41/04 |
| JP | 11-218036 | 8/1999 |
| JP | 2002-021613 | 1/2002 |
| WO | WO9102148 | 2/1991 |

\* cited by examiner

METHOD AND DEVICE FOR CONTROLLING AN INTERNAL COMBUSTION ENGINE

CROSS-REFERENCE TO RELATED APPLICATIONS

The present application claims priority to Application No. 10 2010 045 083.9, filed in the Federal Republic of Germany on Sep. 13, 2010, which is expressly incorporated herein in its entirety by reference thereto.

FIELD OF THE INVENTION

The present invention relates to a method for controlling an internal combustion engine, e.g., a combustion engine in a drive train of a motor vehicle, and to a correspondingly equipped device.

BACKGROUND INFORMATION

Different types of combustion engines such as Otto engines or Diesel engines may be used in the drive train of a motor vehicle. With the aid of the internal combustion engine the energy obtained from the combustion of fuel is able to be utilized for driving the motor vehicle. Examples of internal combustion engines are Otto engines operated using gasoline, and Diesel engines which are operated using Diesel fuel.

Electronic controls may be employed in order to ensure the efficient operation of the internal combustion engine. For example, such a control may be used to control an injection of the fuel into a combustion chamber of the internal combustion engine.

In this context, German Published Patent Application No. 10 2008 001 992 describes a method for controlling the injection process for a Diesel engine, by which reduced emissions in the form of soot particles are achievable. The method is based on an adaptation of the combustion characteristic via the injection pressure.

German Published Patent Application No. 10 2008 004 361 describes adapting the combustion characteristic of a self-igniting Otto engine via the evaluation of various combustion position features. The combustion position features may be, for instance, the maximum combustion pressure position, the 50%-energy conversion position, or the like.

German Published Patent Application No. 39 30 396, Japanese Published Patent Application No. 60-19943, and Japanese Published Patent Application No. 60-32961 describe methods in which the combustion characteristic is adapted via the injected fuel quantity.

German Published Patent Application No. 102 49 755, German Published Patent Application No. 103 44 423, German Published Patent Application No. 103 44 428, and German Published Patent Application No. 10 2007 052 615 described methods in which the combustion characteristic is obtained by subdividing the injection process into a pre-injection and a main injection, or into a main injection and a post-injection.

SUMMARY

Example embodiments of the present invention provide methods and devices for controlling an internal combustion engine by which the emission of particles during operation of the internal combustion engine are able to be reduced efficiently.

According to example embodiments of the present invention, the combustion characteristic of an internal combustion engine is controlled via the start of injection, sometimes also referred to as the injection angle. In particular, it is provided that at least one operating parameter of the internal combustion engine is monitored in order to detect a temporal change in the at least one operating parameter that exceeds a dynamics threshold value. Thus, a dynamic response, i.e., a rapid temporal change of the operating parameter, is detected for one or a plurality of operating parameter(s). The start of injection of the internal combustion engine then is controlled as a function of the detected dynamics. This makes it possible to reduce particle emissions resulting from non-steady operating states caused by the dynamics. The monitored operating parameter may be an engine speed and/or a load of the internal combustion engine, for instance. The load of the internal combustion engine may be described by a relative charge of a combustion chamber or an intake manifold pressure, for example.

The start of injection may be controlled as a function of at least one operating parameter, e.g., on the basis of a characteristics map. In this manner, a suitable start of injection is able to be selected for different steady-state operating states. However, if a dynamics is detected, the start of injection determined by the control is maintained, or frozen, for the duration of a holding period. This has the result that in the transition between two steady-state operating states, the start of injection is not corrected by the control, but initially remains at the value that was set prior to the occurrence of the dynamics. The control of the start of injection may then be continued as soon as a steady-state operating state has been reestablished. This measure considers the fact that the control is usually not optimized for non-steady operating states and consequently may provide injection starts that lead to unnecessarily high particle emissions. In contrast to the continuous control of the start of injection on the basis of a steady-state characteristics map, a relatively simple measure, i.e., freezing of the start of injection, makes it possible to achieve reduced particle emissions.

The holding period may be longer than a dynamics interval during which the monitored operating parameter(s) exceed(s) the dynamics threshold value. This ensures that the control of the start of injection is continued only after a steady-state operating state of the internal combustion engine has come about. In this context it is especially advantageous if the holding period is set as a function of at least one operating parameter of the internal combustion engine, so that the control of the start of injection is able to be continued as soon as possible. The operating parameter as a function of which the holding period is adjusted may be the same operating parameter that is monitored in order to detect the dynamics, such as an engine speed and/or a load of the internal combustion engine, for instance.

In addition, a difference may be determined between the frozen, maintained start of injection and a current start of injection determined by the control, and compared to a difference threshold value. The freezing of the start of injection may then be terminated as a function of the comparison. This makes it possible to avoid excessive deviations of the frozen start of injection from the current start of injection determined by the regulation, as well as any attendant interruptions in the operation of the internal combustion engine.

Furthermore, the control of the start of injection may be implemented as a function of an algebraic sign of the detected temporal change in the at least one operating parameter, i.e., a differentiation is made between a positive and a negative dynamics. For positive dynamics, for example, a different holding period may be selected than for negative dynamics.

Furthermore, a device is provided for controlling an internal combustion engine adapted to implement the method described herein, and a motor vehicle having such a device.

Example embodiments of the present invention are explained in greater detail below with reference to the appended Figures.

DETAILED DESCRIPTION

Figure 1:
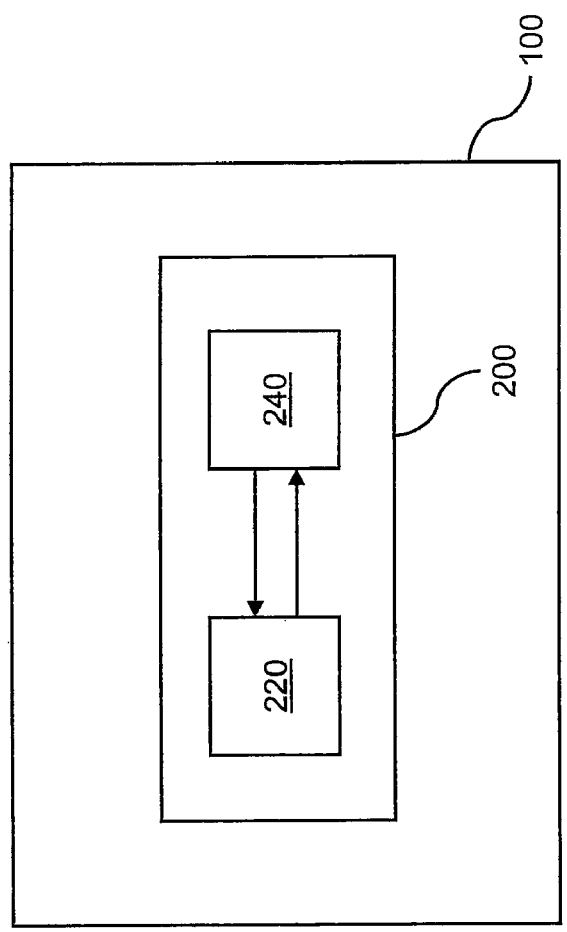
FIG. 1 schematically illustrates a motor vehicle in which the control of the start of injection is provided in a drive train.

The following description of an exemplary embodiment relates to the control of an internal combustion engine in a motor vehicle 100. FIG. 1 illustrates a number of components of motor vehicle 1. For example, FIG. 1 shows a drive train 200 of the motor vehicle, which includes internal combustion engine 220 and an engine control 240.

Internal combustion engine 220 of drive train 200 has the task of converting the energy obtained by the combustion of fuel into mechanical drive energy for driving motor vehicle 100. In the exemplary embodiment illustrated, internal combustion engine 220 is an Otto engine, for whose operation gasoline is used as fuel. It should be understood that the methods and apparatus described herein may also be used for other types of combustion engines, e.g., for combustion engines operated using Diesel fuel. The combustion process in internal combustion engine 220 is controlled by engine control 240. For this purpose, engine control 240 in particular is adapted to control an injection of fuel into a combustion chamber of internal combustion engine 220. The arrangements and methodologies described herein are specifically based on the task of controlling a start of injection of the fuel into the combustion chamber. The start of injection defines the beginning of the injection of fuel into the combustion chamber and sometimes is also defined via an injection angle. The term injection angle, for example, takes the cyclical repetition of the injection process into account and defines the instant within an injection cycle at which the injection commences. A complete injection cycle corresponds to an angle of 360°, and the ratio of the time span between the start of the injection cycle and the start of injection relative to the overall duration of the injection cycle corresponds to the ratio of the injection angle to 360°. In addition to the start of injection, or the injection angle, engine control 240 may also control additional performance quantities of internal combustion engine 220, such as the injection quantity, injection duration, etc. Engine control 240 may be provided in electronic form in the exemplary embodiment shown.

Figure 2:
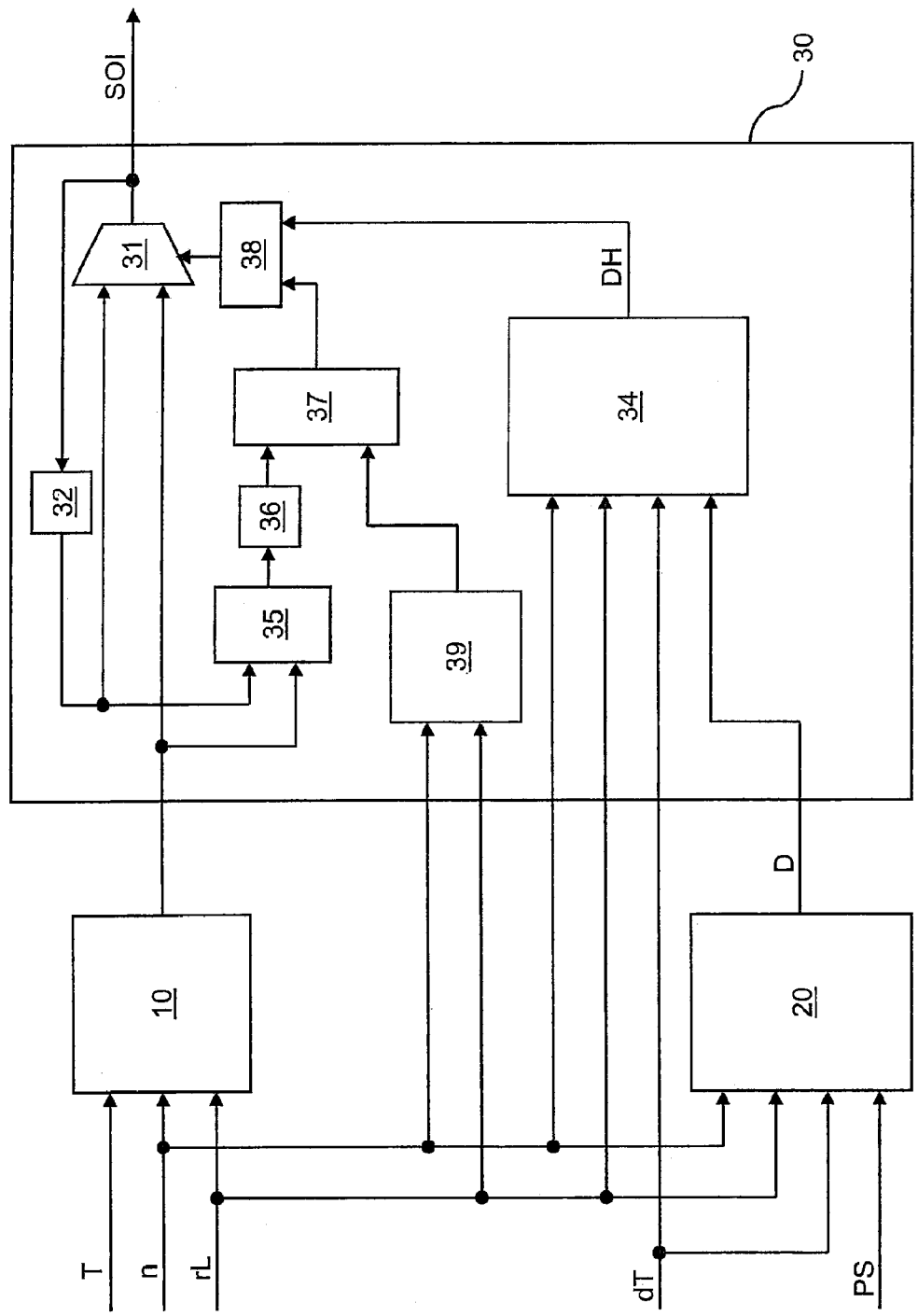
FIG. 2 schematically shows the structure of a device for controlling the start of injection.

FIG. 2 schematically illustrates the structure of engine control 240. As shown, engine control 240 includes a regulation module 10 for regulating injection angle SOI as a function of operating parameters of internal combustion engine 220, a monitoring module 20, and a control module 30. In the exemplary embodiment shown, these operating parameters are a temperature T inside the combustion engine, an engine speed n of internal combustion engine 220, and a relative charge rL of the combustion chamber. These parameters are supplied to regulation module 10 as input quantities. Based on a steady-state characteristics map, regulation module 10 determines a fixedly controlled value for the injection angle. Furthermore, a monitoring module 20 and a control module 30 are provided. The value for the start of injection, determined by regulation module 10, is supplied to control module 30 as an input quantity.

Engine speed n and relative charge rL are received by monitoring module 20 as input quantities. Moreover, an intake manifold pressure as well as a time interval dT are supplied as input quantities to monitoring module 20. Intake manifold pressure PS is a measured quantity acquired by sensors and reflects the current load of internal combustion engine 220. Relative charge rL likewise corresponds to the current load of internal combustion engine 220. However, relative charge rL typically is not acquired with the aid of sensors, but defined as setpoint quantity on the basis of an accelerator pedal position, for instance. Monitoring module 20 is arranged to monitor operating parameters of internal combustion engine 220. In particular, engine speed n as well as the load of internal combustion engine 220 are monitored for dynamics detection. In this context, a dynamics is meant to denote a temporal change of a monitored operating parameter that exceeds a dynamics threshold value. In the exemplary embodiment shown, an engine speed dynamics is detected if the temporal change of engine speed n during time interval dT exceeds a threshold value of an engine speed dynamics. In the same manner, a load dynamics is detected when the change of intake manifold pressure PS during time interval dT exceeds a threshold value of a load dynamics. The threshold value of the engine speed dynamics and/or the threshold value of a load dynamics may be defined on the basis of additional input quantities of monitoring module 20, i.e., on the basis of engine speed n and/or relative charge rL. Upon detection of a dynamics, e.g., an engine speed dynamics and/or a load dynamics, monitoring module 20 outputs a dynamics signal D, which indicates the presence of the recorded dynamics. This may be done by setting a dynamics bit in a digital signal, for example. Furthermore, dynamics signal D may indicate additional characteristics of the detected dynamics. For example, dynamics signal D may indicate whether an engine speed dynamics or a load dynamics is involved. Moreover, an algebraic sign of the dynamics and/or the intensity of a dynamics may be indicated. Dynamics signal D is routed to control module 30.

Control module 30 is configured to control the further processing of the value for the start of injection determined by regulation module 10 as a function of dynamics signal D. In particular, control module 30 is arranged such that in the event of a dynamics, it is able to maintain the injection angle currently determined by regulation module 10 for the duration of a specific holding period. Injection angle SOI provided at the output of control module 30 thus is frozen for the length of the holding period. The injection angle determined in control module 30 by regulation module 10 is supplied to a multiplexer 31 for this purpose. The output signal of multiplexer 31 indicates injection angle SOI to be used by internal combustion engine 220. The output signal of multiplexer 31 is furthermore supplied to a signal memory 32, whose output signal is forwarded to multiplexer 31 as an additional input signal. With the aid of multiplexer 31, a control may therefore take place as to whether the injection angle determined by regulation module 10 or the injection angle stored in signal memory 32 is to be output as injection angle SOI, for use by internal combustion engine 220.

To determine a control signal for multiplexer 31 based on dynamics signal D, control module 30 is equipped with a holding period module 34, to which dynamics signal D is supplied as input signal. Additional input signals received by holding period module 34 are engine speed n of the internal combustion engine, relative charge rL of the internal combustion engine, and time interval dT. On the basis of these input quantities, holding period module 34 determines a suitable holding period when a dynamics is present, and generates a logic signal as output signal DH which is set to a high value for the holding period when a dynamics is detected. This output signal DH of holding period module 34 is routed to multiplexer 31 as control signal, via an AND logic gate.

In the exemplary embodiment shown, control module 30 also includes a comparison branch which has a difference element 35, an amount element 36, and a comparator element 37. As input quantities, difference element 35 receives the injection angle stored in signal memory 32 as well as the injection angle determined by regulation module 10 and forms the difference therefrom, which is forwarded to amount element 36. Amount element 36 calculates the amount of the difference and supplies it to comparator module 37. Comparator module 37 compares the amount of the difference to a difference threshold value and, as long as the amount does not exceed the threshold value, generates as output signal a logic signal having a high value. Consequently, the output of AND logic gate 38 is a logic signal having a high value if the holding period continues, in the presence of a dynamics and, furthermore, the difference between the injection angle stored in signal memory 32 and the injection angle currently determined by the regulation module does not exceed the difference threshold value. In such a case multiplexer 31 is controlled by the logic signal such that the injection angle stored in signal memory 32 is output as injection angle SOI to be used by internal combustion engine 220. Otherwise, the injection angle determined by regulation module 10 is output as injection angle SOI to be used by internal combustion engine 220.

In the exemplary embodiment shown, control module 30 furthermore includes a difference threshold value module 39, which determines the threshold value to be used by comparator element 37. Engine speed n and relative charge rL are supplied to difference threshold value module 39 as input quantities. Thus, the difference threshold value is able to be determined as a function of engine speed n and/or the relative charge. As an alternative, it is also possible to use a fixedly predefined difference threshold value.

Figure 3:
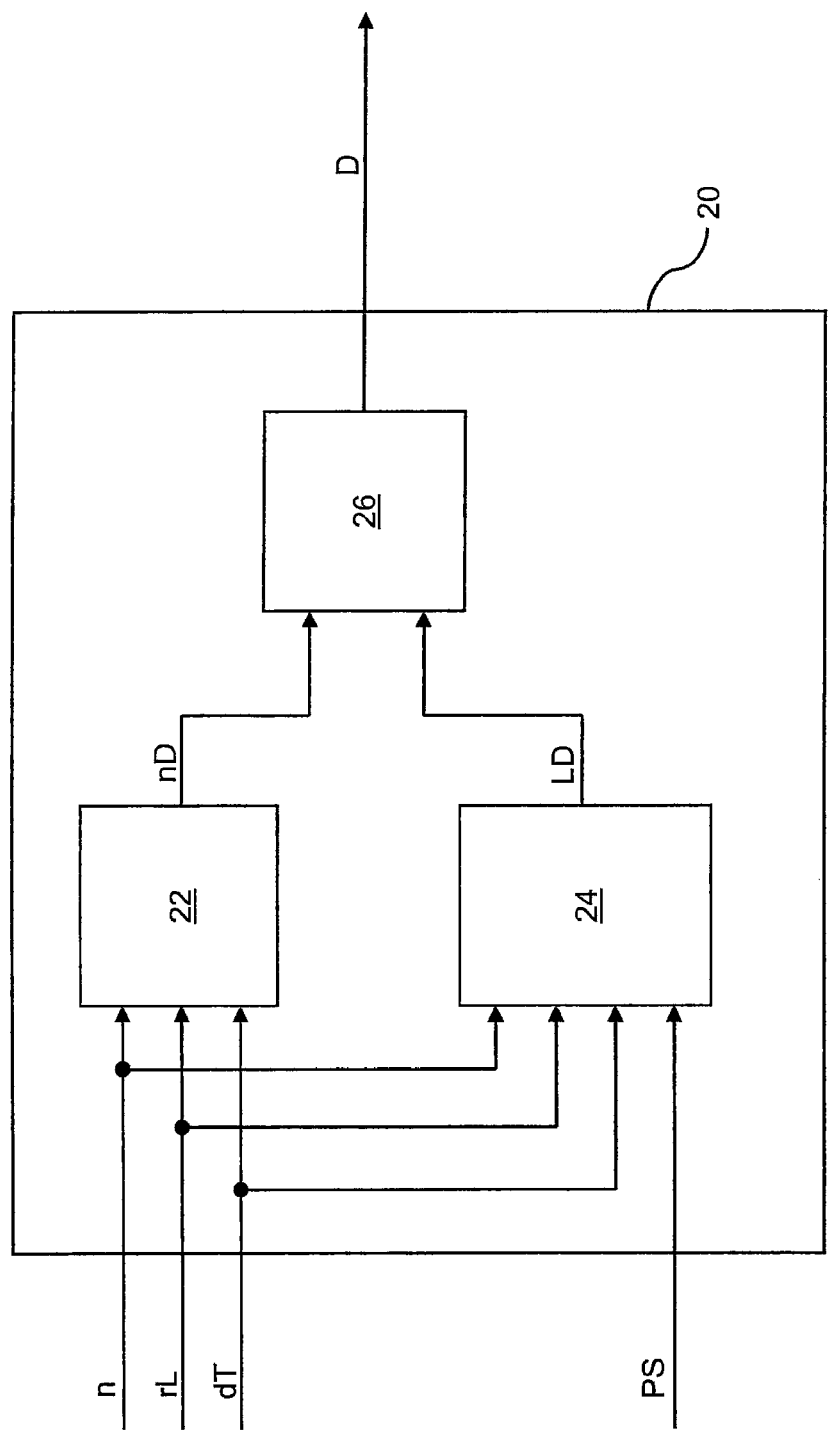
FIG. 3 schematically shows the structure of a device for dynamics detection, which may be used in the device of FIG. 2.

FIG. 3 schematically illustrates the structure of monitoring module 20. As shown, monitoring module 20 includes an engine speed dynamics module 22 and a load dynamics module 24. As input quantities, engine speed dynamics module 22 receives engine speed n and relative charge rL of the internal combustion engine as well as time interval dT. Engine speed dynamics module 22 monitors engine speed n in order to detect dynamics therein. This is achieved by comparing a change in engine speed n in time interval dT to an engine speed dynamics threshold value. The engine speed dynamics threshold value may be determined as a function of engine speed n and/or relative charge rL. If an engine speed dynamics is detected, i.e., if the temporal change of engine speed n exceeds the engine speed dynamics threshold value, engine speed dynamics module 22 generates an engine speed dynamics signal nD, which indicates the presence of the engine speed dynamics. In addition, engine speed dynamics signal nD may also indicate an algebraic sign of the engine speed dynamics and/or an intensity of the engine speed dynamics.

In addition to the mentioned input quantities of engine speed dynamics module 22, load dynamics module 24 also receives intake manifold pressure PS as an additional input quantity. Both the relative charge rL and intake manifold pressure PS correspond to the load of internal combustion engine 220. However, intake manifold pressure PS determined with the aid of sensors on internal combustion engine 220 is advantageously suitable for detecting a load dynamics. Load dynamics module 24 is configured to detect a load dynamics when the change in intake manifold pressure PS during time interval dT exceeds a load dynamics threshold value. The load dynamics threshold value may in turn be determined on the basis of additional input quantities of load dynamics module 24, i.e., on the basis of engine speed n and/or relative charge rL. Load dynamics module 24 generates a load dynamics signal LD, which indicates the presence of the detected load dynamics. Furthermore, load dynamics signal LD may also indicate an algebraic sign of the detected load dynamics and/or an intensity of the detected load dynamics.

Furthermore, monitoring module 20 includes a logic module 26, to which engine speed dynamics signal nD and load dynamics signal LD are supplied. Logic module 26 uses engine speed dynamics signal nD and load dynamics signal LD to form dynamics signal D, which is supplied to control module 30. For this purpose, logic module 26 may in particular induce an OR operation between engine speed dynamics signal nD and load dynamics signal LD, so that dynamics signal D indicates a dynamics when engine speed dynamics signal nD indicates engine speed dynamics or when load dynamics signal LD indicates load dynamics. Moreover, logic module 26 may insert additional information from engine speed dynamics signal nD and/or load dynamics signal LD into dynamics signal D.

Figure 4:
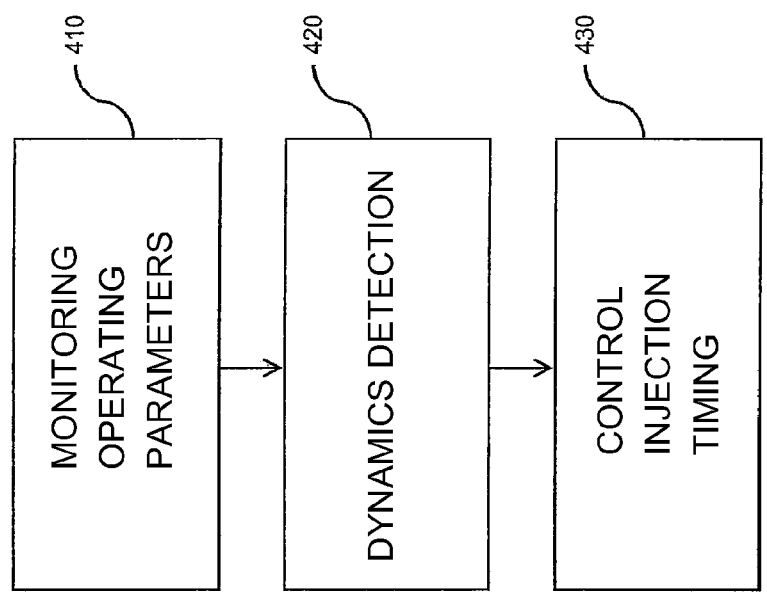
FIG. 4 shows a flow chart to illustrate a method for controlling the start of injection.

FIG. 4 shows a flow chart to illustrate a method according to an example embodiment of the present invention for controlling an internal combustion engine, e.g., internal combustion engine 220, the method being based on the previously described apparatus and methodology described above. The method may be implemented by engine control 240 described with reference to FIGS. 1 to 3.

In step 410, operating parameters of the internal combustion engine are monitored. Monitoring module 20 may be used for this purpose. The monitored operating parameter may be an engine speed n and/or a load of the internal combustion engine, for instance. The load may be described by a relative charge of a combustion chamber of the internal combustion engine and/or by an intake manifold pressure of the internal combustion engine. The operating parameters of the internal combustion engine are monitored to detect dynamics, in particular.

In step 420, a dynamics of the monitored operating parameters is detected by determining that the temporal change of the monitored operating parameter exceeds a dynamics threshold value. The detected dynamics may be engine speed dynamics and/or load dynamics.

In step 430, the start of injection, or the injection angle, of the internal combustion engine is controlled as a function of the detected dynamics. In this manner, it is possible to avoid unnecessary particle emissions due to a start of injection setting that is unsuitable for non-steady operating states. In particular, the start of injection may be frozen for a holding period, as described previously, this holding period possibly being determined again as a function of operating parameters of the internal combustion engine.

Figure 5:
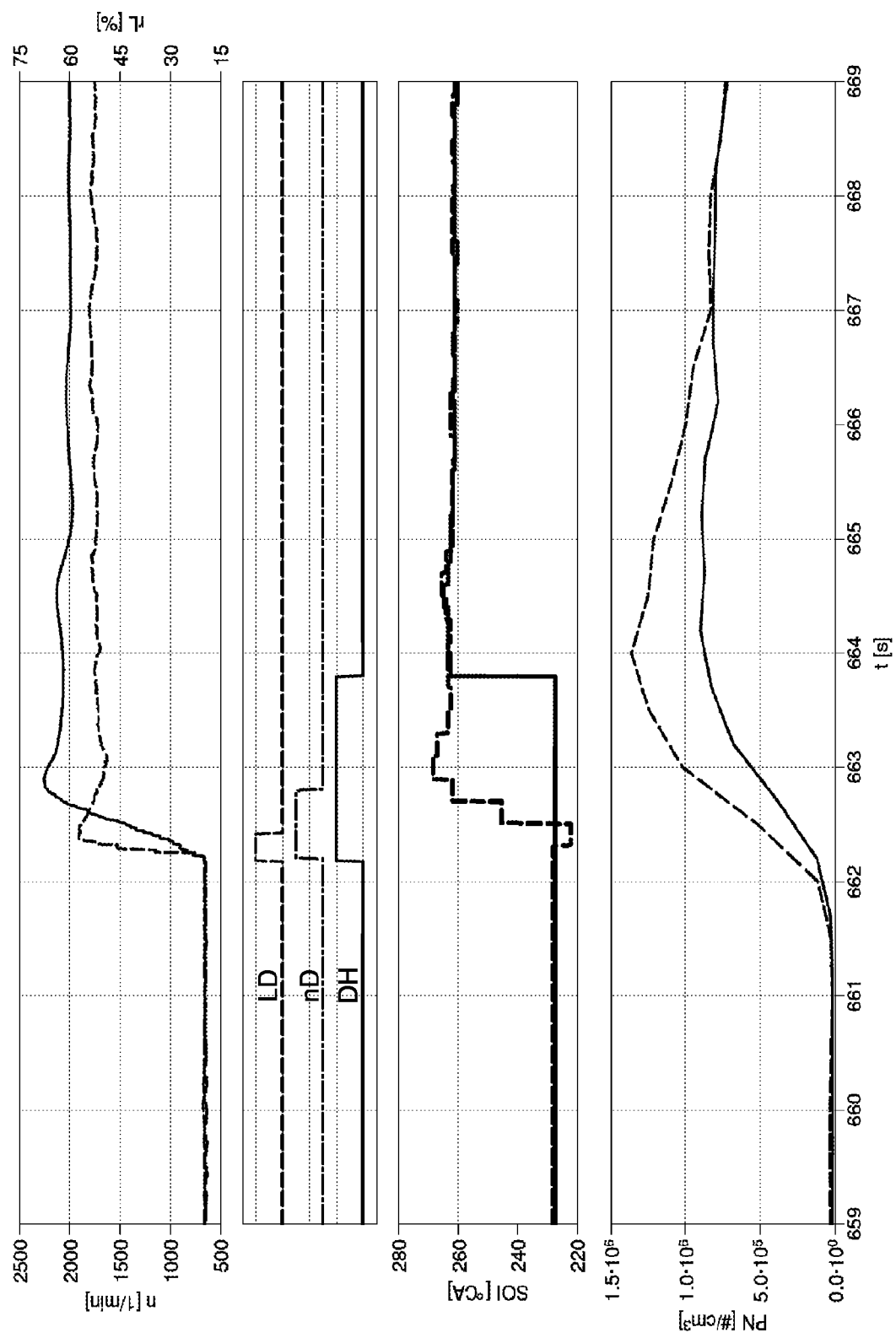
FIG. 5 shows exemplary simulation results to illustrate the mode of action.

FIG. 5 shows exemplary simulation results to illustrate the mode of action of the methods and apparatus described herein. FIG. 5, in particular, illustrates temporal characteristics of engine speed n and relative charge rL and control signals derived therefrom, as well as resulting particle emissions PN.

In the upper diagram of FIG. 5, the time characteristic of engine speed n is illustrated by a solid line, while the time characteristic of relative charge rL is illustrated by a dashed line. As can be seen, there is a dynamics in relation to higher engine speed and higher load at a time t of approximately 662.2 s.

The diagram underneath illustrates how this abrupt load change in load dynamics signal LD, engine speed dynamics signal nD and output signal DH of holding period module 34 manifests itself. It can be seen that the load dynamics is detected for a relatively short time interval of approx. 0.2 s, whereas the engine speed dynamics is detected for a slightly longer time interval of approximately 0.7 s. The output signal of holding time module 34 remains at a high level even after detection of the engine speed dynamics and the load dynamics, until the overall holding period of approx. 1.7 s has elapsed.

The diagram underneath shows injection angle SOI as a solid line. In comparison, the value determined by regulation module 10 is shown as a dashed line. It is clear that the injection angle is frozen once the dynamics has been detected; the value determined by regulation module 10 is reassumed only after the holding period has elapsed.

The lowermost diagram shows particle emissions PN, indicated by a solid line, when the methodologies and apparatus described herein are utilized. In comparison, a dashed line illustrates the particle emissions without using the described control of the injection angle, that is to say, when using only the injection angle determined by regulation module 10. As illustrated, the methodologies and apparatus described herein achieve a considerable reduction of the particle emissions.

It should be understood that the modifications may be made to the methodologies and apparatus described herein. For example, other operating parameters may be used as basis for the regulation and/or the dynamics-dependent control of the start of injection. Furthermore, in other exemplary embodiments, the difference branch described here may be omitted. In addition, simplified exemplary embodiments, in which dynamics threshold values and/or the holding period are/is fixedly defined, are possible as well.

LIST OF REFERENCE CHARACTERS 10 regulation module
20 monitoring module
22 engine speed dynamics module
24 load dynamics module
26 logic module
30 control module
31 multiplexer
32 signal memory
34 holding period module
35 difference element
36 amount element
37 comparator element
38 AND logic gate
39 difference threshold value module
100 motor vehicle
200 drive train
220 internal combustion engine
240 engine control
410 monitoring
420 dynamics detection
430 controlling
D dynamics signal
dT time interval
DH output signal
LD load dynamics signal
n engine speed
nD engine speed dynamics signal
PS intake manifold pressure
rL relative charge
SOI start of injection

What is claimed is:

1. A method for controlling a gasoline engine, said method comprising:
    monitoring, via a monitoring module, at least one operating parameter;
    detecting, via the monitoring module, a temporal change in the at least one operating parameter that exceeds a dynamics threshold value;
    controlling, via a control module, an injection timing of the gasoline engine as a function of the detected temporal change of the at least one operating parameter;
    regulating, via a regulation module, the injection timing as a function of the at least one operating parameter of the gasoline engine, wherein the injection timing defines the time at which a fuel is injected into the gasoline engine;
    if the temporal change of the at least one operating parameter detected by the monitoring module exceeds the dynamics threshold value, maintaining, via the control module, the injection timing determined by the regulation module for a duration of a holding period; and
    adjusting, via a holding period module, the holding period as a function of the at least one operating parameter of the gasoline engine.

2. The method according to claim 1, wherein the at least one operating parameter of the gasoline engine that is monitored includes at least one of (a) an engine speed and (b) a load of the gasoline engine.

3. The method according to claim 1, wherein the holding period is longer than a dynamics period during which the at least one operating parameter exceeds the dynamics threshold value.

4. The method according to claim 1, wherein the at least one operating parameter as a function of which the holding period is set includes at least one of (a) an engine speed and (b) a load of the gasoline engine.

5. The method according to claim 1, further comprising, via the control module:
    determining a difference between the maintained injection timing and an injection timing currently determined by the regulation module;
    comparing the difference to a difference threshold value; and
    terminating the maintenance of the injection timing as a function of the comparison.

6. The method according to claim 1, wherein the control of the injection timing is implemented as a function of an algebraic sign of the detected temporal change of the at least one operating parameter.

7. A device for controlling an injection timing of a gasoline engine, the injection timing defining the time at which a fuel is injected into the gasoline engine, comprising:
    a monitoring module configured to monitor at least one operating parameter of the gasoline engine, the monitoring module configured to detect a temporal change of the at least one operating parameter that exceeds a dynamics threshold value; and a control module configured to control the injection timing of the gasoline engine as a function of the detected temporal change of the at least one operating parameter;

a regulation module configured to regulate the injection timing as a function of the at least one operating parameter of the gasoline engine;

wherein the control module is further configured, if the temporal change of the at least one operating parameter detected by the monitoring module exceeds the dynamics threshold value, to maintain the injection timing determined by the regulation module for a duration of a holding period; and a holding period module configured to adjust the holding period as a function of the at least one operating parameter of the gasoline engine.

8. The device according to claim 7, wherein the device is configured to implement a method including:

monitoring, via the monitoring module, the at least one operating parameter of the gasoline engine;

detecting, via the monitoring module, the temporal change in the at least one operating parameter that exceeds the dynamics threshold value; and controlling, via the control module, the injection timing of the gasoline engine as a function of the detected temporal change of the at least one operating parameter.

9. A motor vehicle, comprising:

a drive train having a gasoline engine; and a device configured to control an injection timing of the gasoline engine, the injection timing defining the time at which a fuel is injected into the gasoline engine, the device including:

a monitoring module configured to monitor at least one operating parameter of the gasoline engine, the monitoring module configured to detect a temporal change of the at least one operating parameter that exceeds a dynamics threshold value; and a control module configured to control the injection timing of the gasoline engine as a function of the detected temporal change of the at least one operating parameter;

a regulation module configured to regulate the injection timing as a function of the at least one operating parameter of the gasoline engine;

wherein the control module is further configured, if the temporal change of the at least one operating parameter detected by the monitoring module exceeds the dynamics threshold value, to maintain the injection timing determined by the regulation module for a duration of a holding period; and a holding period module configured to adjust the holding period as a function of the at least one operating parameter of the gasoline engine.

10. The motor vehicle according to claim 9, wherein the device is adapted to implement a method including:

monitoring, via the monitoring module, the at least one operating parameter of the gasoline engine;

detecting, via the monitoring module, the temporal change in the at least one operating parameter that exceeds the dynamics threshold value; and controlling, via the control module, the injection timing of the gasoline engine as a function of the detected temporal change of the at least one operating parameter.

* * * * *